United States Patent Office 3,475,476
Patented Oct. 28, 1969

3,475,476
PROCESS OF OXIDIZING ALUMINUM ALKYLS
Hoyt J. Cragg and Doyle A. Nolen, Baton Rouge, La., assignors to Ethyl Corporation, New York, N.Y., a corporation of Virginia
No Drawing. Filed June 16, 1966, Ser. No. 557,919
Int. Cl. C07f 5/06
U.S. Cl. 260—448                                       17 Claims

ABSTRACT OF THE DISCLOSURE

The oxidation of aluminum alkyls to produce aluminum trialkoxide compounds is enhanced by using as catalysts organo compounds of Groups III–B, IV–B and V–B metals. When resulting trialkoxide compounds are hydrolyzed to produce alcohols, unacceptable contamination of valuable by-product material is avoided.

---

This invention relates to the oxidation of organometallic compounds. In greater particularity the invention relates to the oxidation of a class of materials known as aluminum alkyls. including aluminum alkyl-aluminum alkoxide statistically distributed mixtures of various ratios and molecular weights and in which the organic radicals are similar or dissimilar. Such an oxidation of such materials is of vast commercial importance in the preparation of higher synthetic normal alcohols by the hydrolysis of the resulting aluminum alkoxide. The present improvement is directed toward enhancement of the oxidation and avoidance of unacceptable contamination of valuable by-product materials.

In such an alcohol process the hydrolysis is frequently desirably conducted using a dilute sulfuric acid solution in which case the aluminum component of the alkoxides combines with the sulfate component of the acid to produce aluminum sulfate or alum. The alum derived in this manner can be of a high quality and is readily disposable at substantial economic advantage to the overall process. Quality or purity is important because many users of alum, such as those who produce catalysts from the alum, are quite particular as to the presence of even trace quantities of contaminants and purchase only from selected sources. In the present instance the "contamination" can actually be beneficial in imparting new desirable or enhanced properties to catalyst materials. Thus the present improvement in oxidation catalysis actually can enhance the value of the by-product alum.

The alcohols obtainable with a process such as the foregoing can be tailor-made particularly as to molecular weight range by selecting aluminum alkyls which have alkyl (or more broadly, organo) radicals corresponding in number of carbon atoms per molecule and in skeletal configuration to the alcohol desired. As an example where normal dodecyl alcohol is desired, one preferably oxidizes an aluminum alkyl in which all alkyl groups present are normal $C_{12}$ and then subjects the resulting aluminum alkoxide to hydrolysis as with a mineral acid from which one obtains the desired dodecyl alcohol and alum. A disadvantage of the conventional process for producing alcohols in this manner or in other processes involving such an oxidation of aluminum alkyls is that, although the conventional oxidation of aluminum alkyls is a comparatively simple operation which takes place even with molecular oxygen (air) under moderate conditions such as about 0–50° C., it is accompanied by the production of oxidation by-product materials which are not convertible to alcohols in the subsequent alkoxide hydrolysis operation or are difficultly removable from the alcohols. This results in losses of raw materials necessitating either increased costs of product alcohols or the expenditure of considerable effort in economically disposing of organic by-product materials or converting them to some desired material such as the alcohols, the latter operation invariably involving substantial undesired expense and complication of apparatus. Typical of the by-products resulting from the oxidation of aluminum alkyls are aldehydes, paraffins, esters, olefins and free alcohols and the oxidation is frequently incomplete resulting in further losses. The free alcohols are undesired at this point because of recovery difficulties. The amount of by-product formation and losses experienced is quite large, easily equal to about 25 percent of the total alcohol production after hydrolysis as the overall process is normally performed using prior art oxidation techniques.

Another point of considerable significance is the purity of the product alcohols obtained through the aluminum alkyl-oxidation-hydrolysis process described in the foregoing. Such alcohols find important utility as a replacement for alcohols derived from naturally occurring coconut oil through conventional processing involving steps such as saponification and hydrogenation. The naturally derived (coconut) alcohols are normally produced in an exceedingly high purity with characteristic uniform trace impurities which has become virtually a standard as regards properties such as molecular weight distribution, exclusively "even" numbers of carbon atoms per molecule, unsaturation, and exclusively straight chain skeletal configuration, as well as odor characteristics, trace impurities, and the like. Normally it is desired that this standard be met even as to trace contaminants by competing synthetics. The foregoing synthetic alcohols derived through aluminum chemistry occasionally suffer from content of trace quantities of "non-natural" impurities which (1) produce undesired odors when the alcohols are used as for example in a conversion to sodium alkyl sulfate pastes which are used in rug shampoos and cannot be readily rinsed, and (2) decompose or promote alcohol decomposition when subjected to moderate temperatures used in certain processing operations. The odor problem is not apparent from the alcohols themselves but is usually associated with the presence in the alcohols of diols which cyclicize in the sulfation process to form highly odorous substituted tetrahydrofuran materials. The heat stability problem is usually associated with the presence of carbonyl-type groups which decompose, possibly in a type of sequential or chain reaction involving alcohol molecules.

These odor and heat stability problems when encountered are difficult to solve. Hydrogenation alleviates the problem to some extent at reasonable cost however as one goes to more severe hydrogenation conditions or "twice-through" operation seeking even more complete removal of these impurities one soon reaches a point of diminishing return as more and more alcohol molecules are converted by the hydrogenation into paraffins and other undesired materials.

British Patent 1,006,047 seeks to alleviate the odor problem with selective adsorbents. Although the novelty of such procedures is not clear since selective adsorption is an analysis technique of long standing, economics is the significant adverse factor to consider because in this application adsorbents become saturated with alcohol very rapidly and thereby lose their selective properties for diols.

It has now been found that through the use of new oxidation catalysis principles it is possible to improve the oxidation of aluminum alkyl materials to such an extent as to virtually eliminate the formation of both the large quantity oxidation by-product materials and the trace contaminant materials discussed in the foregoing. The elimination of the production of such materials effects a substantial and dramatic increase in the yield of alkoxide from the oxidation step, vastly enhances the economics of the process, and dramatically reduces the "trace-contaminant" problem. Through these and several other techniques it is now possible to produce synthetic alcohols which are superior to the naturally derived materials.

The use of catalysis in the oxidation of aluminum alkyl materials is not a totally new endeavor. Catalysis by virtue of zinc and cadmium compounds is discussed in British Patent 993,666. Catalysis by way of titanium tetrachloride is discussed in Belgian Patent 553,721 and abandoned U.S. application Ser. No. 555,273 filed Dec. 27, 1955. Unfortunately however the prior art catalysis suffers from serious disadvantages in that the residual catalyst materials provide undesirable contamination of the valuable by-product alum obtained in sulfuric acid hydrolysis of the alkoxide. Particularly objectionable is the contamination resulting from halogen presence due to such prior art catalysts. With titanium tetrachloride catalysis for example, the chloride contamination of the alum is so severe and is so difficult to remove as to make it virtually impossible to derive any economic return from the sale of by-product alum. Some alum contamination also results from titanium presence, however this is less serious, can even be beneficial, and the lowering of such titanium contamination is not as difficult as is the removal of halogen contamination. As an example the alcohol is separated from the aluminum sulfate contaminated with titanium sulfate and the sulfate mixture is then hydrolyzed at a pH of about 2–3 for 2 to 4 hours at about 95° C. whereby the titanium sulfate is converted to a separate phase of titanium dioxide which is removable by filtration and settling. This purification is enhanced by seeding with 1–10 weight percent of titanium dioxide particles. In this way it is possible to lower the alum contamination from a typical 200 parts per million to about 10 parts per million which is quite low.

It has now been found that successful catalysis of oxidation of aluminum alkyl materials is possible utilizing organo compounds of the Groups III–B, IV–B, and V–B metals as listed in the 1955 Periodic Table of Fisher Scientific Company. These metals are further identified as scandium, yttrium, lanthanum, titanium, zirconium, hafnium, vanadium, niobium, tantalum, and uranium. In general the titanium and zirconium compounds are most preferred from a cost-effectiveness viewpoint and the fact that certain highly effective organo titanium compounds are readily prepared. The organo constituents of these catalysts are preferably pure or mixed alkoxides having from about 2 to about 40 carbon atoms per radical. In oxidations so catalyzed the organic by-product problem is virtually eliminated. Alkoxides equal to product alcohols can be used. The lower melting point of the lower alkoxides, together with the higher percentage of titanium in such materials, frequently provides significant advantages as to ease of handling. Thus titanium tetrachloride is typically reacted with isopropanol or dodecanol-1 or mixtures of normal alcohols of about the same molecular weight range as the desired alcohols to produce the desired titanate material. Catalyst was obtained in this way for Example VII. It is usually advisable to drive the reaction to completion by removal of by-product hydrochloric acid. Such removal is typically effected by treating the mixture with ammonia (or other bases) to form ammonium chloride which is removable by conventional techniques such as filtration. The nearly complete removal of HCl from the catalyst prior to delivery to the oxidation system is necessary where freedom from chloride content of the alkoxide hydrolysis by-products is desired. Alternatively, the organic titanate catalyst may be prepared by reacting a sodium alkoxide with TiCl$_4$, and separating the catalyst from the resultant precipitate of NaCl by filtration or distillation.

The organic titanate material free of chloride-containing materials is employed as a catalyst in the oxidation of aluminum alkyl materials.

It is generally characteristic of the oxidation of aluminum alkyl materials even without catalysts that the first and second alkyl groups of the trialkyl molecules readily oxidize as desired. However the third alkyl group is more difficult to convert. The formation of by-products, although measurable, is not of any great concern until approximately 50–70 percent of the total alkyl groups present have been converted to alkoxide groups as a result of the oxidation.

In addition, aluminum alkyls produced through chain growth and displacement are accompanied by olefins and this mixture cannot be distilled to a sufficient extent to completely remove the olefins without degradation of the olefins and alkyls through isomerization and displacement. A brief mild flash to remove part of the olefins is normally all that can be tolerated. On the other hand the residual olefins can be removed quite safely and readily from a partially oxidized aluminum alkyl-alkoxide mixture by a simple flash because the partially oxidized aluminum materials have a significantly lower vapor pressure than the aluminum alkyls. Thus it is usually desirable to perform such an oxidation in two steps each being preceded and followed by "flashes" for removal of various olefins and other materials as convenient.

It has been found advantageous to employ the two step oxidation technique when using the titanium material as a catalyst carrying the first stage oxidation to about 50–70 percent conversion of the alkyls present to alkoxides in a continuous flow operation. Following the first stage non-catalyzed oxidation, and after flash of the residual olefins, the titanium catalyst material is added to the alkoxide-alkyl material for the second step "batch" oxidation which is otherwise conducted very much as in the prior art. The conditions for the second step oxidation are preferably somewhat more severe than those previously employed for non-catalyzed second step oxidation of the prior art. In general a diluent, preferably inert, is desirable in the second oxidation step because of viscosity problems. Such can be olefin or saturated hydrocarbon of a molecular weight lower than that of the alkyl residues present to facilitate removal by flashing. Typically the diluent is used in about equal portions by weight relative to the aluminum materials.

It should be understood that, although plural step oxidation with oxidation catalyst present in only the latter staging is a preferred way of applying the present principles of oxidation catalysis, such an exemplification is not necessarily the only possible scheme for deriving advantage from oxidation catalysis. Benefits are also obtainable for example in a single batch oxidation in which instance the presence of titanium material free of halogen contamination is desirable during the entire oxidation step or is added at an intermediate stage in the overall oxidation, thus becoming similar to a two step operation.

The principles of the present invention, although admirably suited for exemplification in connection with an alcohol process, are not limited to inclusion as part of such an alcohol process but are in general usable to advantage in any process which involves the oxidation of aluminum alkyls to produce aluminum alkoxides. Such catalytic effect is useful where the total of metal alkyl and alkoxide groups present to be further oxidized is predominantly alkyl as well as where it is predominantly alkoxide.

In general the oxidation catalysis is not extremely critical as to conditions or restricted to any narrow range of oxidation conditions or extent of oxidation or to any particular feed composition or molecular weight. Improvement as to by-products will be realized when using catalysis under conditions conventional in the art for non-catalyzed oxidation. On the other hand on a cost-effectiveness basis it is usually preferred that the catalytic process employ as feed a partially oxidized material having approximately equal quantities of alkyl and alkoxide residues on the metal employed and seek virtually complete conversion of alkyl residues present to the alkoxide using somewhat more severe oxidation conditions than non-catalyzed oxidation.

A significant condition involved is that of quantity of catalyst used. This ranges from 0.1 to 10 grams of titanium type metal constituent of the catalyst present per 100 grams of aluminum present in the reaction mass. A more preferred range is from about 0.25 to 4 grams per 100 grams, with a ratio of about 0.65 gram titanium per 100 grams aluminum being preferred.

EXAMPLE I

A sample of partially oxidized aluminum alkyls (approximately 50 percent alkoxide) having a distribution of approximately 65 percent (wt.) $C_{12}$, 25 percent $C_{14}$ and 10 percent $C_{16}$ normal groups was oxidized at about 71° C. with vigorous agitation under a pressure of 45 p.s.i.g. using air bubbled in at the bottom of a stirred pot reactor at a rate of about 47 pounds of air per hour per square foot of free cross section area. Tetraisopropoxy titanate was added at the start on a basis of 0.65 percent titanium (by weight) relative to the aluminum present. The solvent used was inert hydrocarbon approximately equal (weight) to the starting alkyl-alkoxide mixture. Oxygen content of the off-gas was negligible for the first three hours of operation. As the oxygen content of the off-gas began to increase, the air rate was decreased to maintain the oxygen content of off-gas slightly below 7 percent to avoid explosion danger and finally as the oxygen progressed further a mixture of air and nitrogen was used. The oxidation was declared complete after five hours and twenty minutes. Samples were taken at the three hour point and at the conclusion and analyzed. Results from the analyses were compared with results of a non-catalyzed oxidation (Example III). The tabulation of results follows Example III.

EXAMPLE II

Example I was repeated with a titanium content of 0.27 on the same basis as before. The oxidation time total was 4.4 hours, keeping the oxygen content of the off-gas below 7 percent. The results are tabulated after Example III.

percent, based on total "mols" of alkyl groups and alkoxide groups in the feed.

|   | Example I 3 Hrs. | Example I End | Example II | Example III |
|---|---|---|---|---|
| 1. Alkoxide Groups | 86.56 | 96.19 | 87.96 | 73.13 |
| 2. Alcohol | −0.35 | −0.51 | −0.50 | 1.82 |
| 3. Paraffins | 2.05 | 3.11 | 6.38 | 6.51 |
| 4. Aldehydes | 0.16 | 0.26 | 0.56 | 6.10 |
| 5. Esters | 0.57 | 0.63 | 1.23 | 2.54 |
| 6. Unreacted Alkyls | 7.43 | 1.38 | 1.57 | 4.04 |
| 7. Unaccounted | 3.56 | 0.00 | 2.80 | 5.86 |
|   | 100.00 | 101.06 | 100.00 | 100.00 |

The negative values for alcohols in the above represent a conversion of alcohols already present in the feed resulting from the prior first stage non-catalytic oxidation which provided the feed for these examples. The "Unaccounted" category is based upon an aluminum balance as is the (above 100%) figure for the End of Example I.

Examples I–III were based on conditions believed to be close to optimum and were performed in a large scale unit with virtually identical feed and other factors seeking to compare on a large scale the best prior art (Example III as developed over many months of experimentation), with the best expected first run in a large scale unit where experimentation as to new factors is extremely expensive.

The conditions of Example I were selected after numerous pilot plant runs over an extended period using different feeds. An interesting observation is that the results of Example I are not merely vastly superior to the 75 percent yield region of the best prior art type of oxidation (Example III) but are vastly superior to what was expected from even the present pilot plant data (Examples IV to IX).

EXAMPLES IV–IX

These represent a number of typical pilot plant runs similar to Example I, made with different catalysts, different catalyst concentrations and widely different feeds. Results are not directly comparable in regard to the by-products because some feeds contained significant quantities of various by-products at the start. Certain trends confirmed in other runs are indicated however.

As an example one can note the generally more severe conditions as to temperature and longer reaction times (compared to Example III).

Example IX shows some improvement over non-catalyzed oxidation as to alkoxide yield but this is considerably less than with the other runs at higher catalyst concentrations.

Aldehyde contents in all runs appears much lower than in Example III. Esters are much lower than in Example III in all runs except the low catalyst Example IX.

Examples IV to IX were run at a pressure of 10 p.s.i.g.

EXAMPLES IV-IX

| Example | Catalyst Type | Concentration percent | T., °C. | Alkoxide | Alcohol | Paraffin | Aldehydes | Esters | Unreacted Alkyls | Unaccounted | Time |
|---|---|---|---|---|---|---|---|---|---|---|---|
| IV | Ti(n-C$_4$O)$_4$ | 3.0 | 60–80 | 85.17 | 0.22 | 6.68 | 0.29 | 0.49 | 3.00 | 4.15 | 7 Hrs.-15 Min. |
| V | Ti(n-C$_4$O)$_4$ | 2.0 | 45–80 | 88.69 | 0.04 | 0.85 | 0.00 | 0.15 | 6.86 | 3.42 | 6 Hrs. |
| VI | Ti(n-C$_4$O)$_4$ | 0.5 | 95 | 87.62 | 0.24 | 6.04 | 0.01 | 0.69 | 2.86 | 2.54 | 6 Hrs.-40 Min. |
| VII | Ti(n-C$_{8-10}$O)$_4$ | 2.0 | 45–80 | 92.51 | 1.00 | 2.00 | 0.20 | 0.49 | 1.76 | 1.99 | 9 Hrs. |
| VIII | Ti(i-C$_3$O)$_4$ | 0.5 | 80 | 85.32 | 0.65 | 6.18 | 0.00 | 0.36 | 2.29 | 5.20 | 6 Hrs. |
| IX | Ti(i-C$_3$O)$_4$ | 0.1 | 80 | 82.52 | 0.35 | 8.17 | 0.30 | 1.49 | 5.35 | 1.87 | 6 Hrs. |

EXAMPLE III

Example I was repeated without catalyst. Oxidation was conducted at 44° C. and a pressure of 10 p.s.i.g. Using the same air rate as for the first three hours of Example I, oxygen abruptly broke through at 2 hours which is characteristic of such oxidation at virtual completion.

A comparison with the results of Example I, II and III is as follows, yields of each material being shown in

EXAMPLE X

Previous runs are repeated with other organo metal materials saturated, unsaturated, straight chain, branched chain, cyclic and combinations of these characteristics, having up to about 20 carbon atoms per organo radical, and with different catalyst proportions and materials providing various metal constituents scandium, yttrium, lanthanum, titanium, zirconium, hafnium, vanadium, niobium, tantalum, and uranium in quantities from about 0.1 percent to 10 percent by weight of the aluminum present, times from about 1 hour to 15 hours, temperatures from about 0° C. to about 100° C., pressures from about atmospheric to about 20 atmospheres. Similar beneficial results are obtained.

Particular attention is given to the use of the preferred catalyst materials and ratios of temperatures from about 45° C. to about 95° C., total pressures of from about atmospheric to about 84.7 p.s.i.a., and oxygen content of 20.0 to 100.0 percent.

EXAMPLES XI–XVII

A series of runs was made to show an alum purification process. The alum solution from hydrolysis is a concentrated but not saturated solution containing about 227 parts per million of titanium in the total solids. To this was added titanium dioxide in several different runs to an extent of the indicated percentage (by weight) of the starting solids. This material acted as a seeding agent causing titanium sulfate to convert to titanium dioxide and build-up on the "seed." This action was enhanced by heating for various times at various temperatures. The product was filtered to remove seed and built-up materials and analyzed to determine parts per million of titanium relative to the solids in solution in the filtrate.

The examples show that it is practical to reduce titanium concentration to a low level where such is required however in instances where the titanium content of the alum is desired there is of course no necessity to perform this purification. Excellent results as to purification are shown by Example XIII which is considered as representing the limiting solubility.

| Alum Example | Starting Titanium, p.p.m. | TiO$_2$ Added, percent | Heating Period, Hrs. | Heating Temperature, ° C. | Final Titanium Concentration, p.p.m. |
|---|---|---|---|---|---|
| XI | 227 | 10 | 2 | 95 | 22 |
| XII | 227 | 10 | 4 | 95 | 16 |
| XIII | 227 | 10 | 6 | 95 | 10 |
| XIV | 227 | 5 | 6 | 95 | 25 |
| XV | 227 | 2 | 6 | 95 | 39 |
| XVI | 227 | 1 | 6 | 95 | 24 |
| XVII | 227 | 5 | 6 | 75 | 33 |

What is claimed is:

1. In the process for reacting materials selected from the class consisting of aluminum alkyls and aluminum alkyl-aluminum alkoxide mixtures with materials selected from the group consisting of oxygen and oxygen containing materials under conditions conducive to the conversion of aluminum alkyls to aluminum alkoxides, the improvement which comprises combining organometal catalyst with the reaction mass prior to completion of the reaction, the amount of said catalyst added being such that the metal constituent thereof is from about 0.1 to about 10.0 weight percent of the aluminum present, metal constituency of said catalyst being selected from the group consisting of scandium, titanium, vanadium, yttrium, zirconium, niobium, lanthanum, hafnium, tantalum, including substantially a single member of said group and mixtures of the members, the organo constituency of said catalyst being selected from the group consisting of oxy hydrocarbon radicals and mixtures of hydrocarbon and oxy hydrocarbon radicals.

2. The process of claim 1 wherein the combining is performed at a stage of the reaction wherein the aluminum materials are from about 50% to about 70% alkoxide.

3. The process of claim 1 wherein the reaction occurs in a plurality of steps and the combining operation occurs at an intermediate step.

4. The process of claim 1 wherein the material are reacted in a first step to an aluminum alkoxide content from about 50% to about 70% of the organo aluminum groups present and in a second step to substantial completion of oxidative conversion of alkyl groups, the combining step occurring between the first and second steps.

5. The process of claim 1 wherein the metal constituency of the catalyst combined with the reaction mass is selected essentially from the group consisting of titanium and zirconium and mixtures thereof.

6. The process of claim 1 wherein the metal constituency of the catalyst combined with the reaction mass is essentially titanium and the organo constituency is essentially alkoxy radicals.

7. The process of claim 1 wherein the organo constituency of the catalyst combined with the reaction mass is essentially alkoxy radicals.

8. The process of claim 1 wherein the organo constituency of the catalyst in the reaction mass corresponds essentially to the organo radicals of the materials involved in the reaction mass.

9. The process of claim 1 wherein the organo constituency of the catalyst combined with the reaction mass corresponds essentially to the organo radicals of the materials oxidized.

10. The process of claim 1 wherein the organo constituency of the catalyst combined with the reaction mass has up to about 6 carbon atoms per radical and is selected from the group consisting of oxy hydrocarbon radicals and mixtures of hydrocarbon and oxy hydrocarbon radicals.

11. The process of claim 1 wherein the organo constituency of the catalyst combined with the reaction mass is selected from the group of lower alkoxy radicals and mixtures of lower alkyl and lower alkoxy radicals in which the radicals contain up to about 4 carbon atoms each.

12. The process of claim 1 wherein the catalyst is tetraisopropoxy titanium.

13. The process of claim 1 wherein the metal constituency percentage, same basis, is from about 0.1 to about 3.0.

14. The process of claim 1 wherein the metal constituency percentage, same basis, is from about 0.1 to about 1.0.

15. The process of claim 1 wherein the metal constituency percentage, same basis, is about 0.65.

16. The process of claim 1 wherein the reaction temperature is from about 45° C. to about 95° C.

17. In the process for reacting materials selected from the class consisting of aluminum alkyls and aluminum alkyl-aluminum alkoxide mixtures with materials selected from the group consisting of oxygen and oxygen containing materials under conditions conducive to the conversion of aluminum alkyls to aluminum alkoxides, the improvement which comprises combining organometal catalyst with the reaction mass prior to completion of the reaction, the aluminum alkyl-aluminum alkoxide mixtures being from about 50 percent to about 70 percent alkoxide, the catalyst used being titanium isopropoxide in an amount of about 0.65 percent by weight of the titanium content relative to the aluminum content of the alkyl-alkoxide mixtures, the oxidation being conducted at a temperature of about 70° C. and a pressure of about 45 p.s.i.a.

References Cited

UNITED STATES PATENTS

| 3,070,616 | 12/1962 | Flanagan | 260—448 |
| 3,097,226 | 7/1963 | Napier | 260—448 |
| 3,153,076 | 10/1964 | Wood et al. | 260—448 |
| 3,262,957 | 7/1966 | Roha et al. | 260—448 |
| 3,324,160 | 6/1967 | Wright et al. | 260—448 |

FOREIGN PATENTS 553,721 Belgium.

TOBIAS E. LEVOW, Primary Examiner

H. M. S. SNEED, Assistant Examiner